US012386563B2

(12) United States Patent
Dai et al.

(10) Patent No.: US 12,386,563 B2
(45) Date of Patent: Aug. 12, 2025

(54) NMP EMULATOR BASED ON NUMA ARCHITECTURE AND OPERATING METHOD THEREOF

(71) Applicant: SAMSUNG ELECTRONICS CO., LTD., Suwon-si (KR)

(72) Inventors: Yuehua Dai, Xi'an (CN); Liyuan Zhang, Xi'an (CN); Xiao Lan, Xi'an (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 18/404,348

(22) Filed: Jan. 4, 2024

(65) Prior Publication Data

US 2024/0231680 A1    Jul. 11, 2024

(30) Foreign Application Priority Data

Jan. 9, 2023  (CN) .......................... 202310028391.7
Oct. 24, 2023  (KR) ........................ 10-2023-0143154

(51) Int. Cl.
G06F 3/06    (2006.01)

(52) U.S. Cl.
CPC .......... *G06F 3/0664* (2013.01); *G06F 3/0604* (2013.01); *G06F 3/0655* (2013.01); *G06F 3/067* (2013.01); *G06F 3/0673* (2013.01)

(58) Field of Classification Search
None
See application file for complete search history.

(56) References Cited

U.S. PATENT DOCUMENTS

2013/0024646 A1    1/2013  Liu et al.
2020/0326868 A1*  10/2020  Yang ..................... G06F 3/0673

FOREIGN PATENT DOCUMENTS

CN    107193636 A    9/2017
KR    10-1480954 B1    1/2015

OTHER PUBLICATIONS

Liu, Yi, et al., "SimNUMA: Simulating NUMA-Architecture Multiprocessor Systems Efficiently," International Conference on Parallel and Distributed Systems, 2013, (8 Pages in English).

\* cited by examiner

*Primary Examiner* — Charles J Choi
(74) *Attorney, Agent, or Firm* — NSIP Law (57) ABSTRACT

A non-uniform memory access (NUMA) architecture-based near-memory processing (NMP) emulator apparatus includes a host simulator module configured to perform a function of a host system using a non-uniform memory access (NUMA) node of a NUMA architecture, and one or more acceleration dual in-line memory module (AXDIMM) emulator modules, wherein each of the one or more AXDIMM emulator modules is configured to perform a function of a stream of an AXDIMM architecture using a NUMA node of the NUMA architecture.

18 Claims, 8 Drawing Sheets

NMP EMULATOR BASED ON NUMA ARCHITECTURE AND OPERATING METHOD THEREOF

CROSS-REFERENCE TO RELATED APPLICATIONS

This application claims the benefit under 35 USC § 119(a) of Chinese Patent Application No. 202310028391.7 filed on Jan. 9, 2023, in the China National Intellectual Property Administration, and Korean Patent Application No. 10-2023-0143154 filed on Oct. 24, 2023, in the Korean Intellectual Property Office, the entire disclosures of which are incorporated herein by reference for all purposes.

BACKGROUND

1. Field

The following description relates to a near-memory processing (NMP) emulator based on a non-uniform memory access (NUMA) architecture and operating method thereof.

2. Description of Related Art

Data movement between processing units and main memory may frequently hinder the processing of massive data sets. Near-memory processing (NMP), which is a data-centric modern computing paradigm, may relieve such an issue and improve the application performance. However, because actual operating NMP system products have not yet been produced, emulators may still be used as a main tool for functional verification and performance evaluation of applications.

As an effective method for verifying hardware design and architecture, a typical simulation method may be used, which is largely classified into a software (S/W)-based simulation method and a field-programmable gate array (FPGA)-based simulation method. Although the two simulation methods may be used for simulations to verify functions and evaluate the performance of hardware systems, they may still have some issues to be solved. For example, the S/W-based simulation method may achieve clock-level simulation accuracy but show degrading performance when simulating large-scale applications, while the FPGA-based simulation method may accurately simulate hardware but have a great development burden and degrading scalability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a non-uniform memory access (NUMA) architecture-based near-memory processing (NMP) emulator apparatus includes: a host simulator module configured to perform a function of a host system using a non-uniform memory access (NUMA) node of a NUMA architecture; and one or more acceleration dual in-line memory module (AXDIMM) emulator modules, wherein each of the one or more AXDIMM emulator modules is configured to perform a function of a stream of an AXDIMM architecture using a NUMA node of the NUMA architecture.

The host simulator module may include an interaction module configured to implement an interaction between the host simulator module and the one or more AXDIMM emulator modules.

Each of the one or more AXDIMM emulator modules may be configured to perform a function of parallelizing an internal bandwidth of a corresponding stream of the AXDIMM architecture by using a plurality of NUMA memory channels of a corresponding NUMA node in parallel.

Each of the one or more AXDIMM emulator modules may include: an acceleration (AX) accelerator configured to perform a function of a processing unit of a corresponding stream of the AXDIMM architecture by using an isolated central processing unit (CPU) of a corresponding NUMA node; an AX memory configured to implement a function of a dynamic random-access memory (DRAM) array of the stream of the AXDIMM architecture by using a reserved memory of the NUMA node; and an AX buffer configured to implement a caching function using a memory other than the reserved memory of the NUMA node and a shared level 3 (L3) cache.

The AX accelerator may be configured to obtain a function by programming using the isolated CPU and perform the obtained function.

In one or more general aspects, a processor-implemented method includes: allocating a non-uniform memory access (NUMA) node of a NUMA architecture to a host simulator module of a near-memory processing (NMP) emulator to perform a function of a host system; allocating a NUMA node of the NUMA architecture to each of one or more acceleration dual in-line memory module (AXDIMM) emulator modules of the NMP emulator to perform a function of a stream of an AXDIMM architecture; and executing an application using the NMP emulator.

The host simulator module may be configured to interact with the one or more AXDIMM emulator modules through an interaction module of the host simulator module.

The allocating of the NUMA node of the NUMA architecture to the host simulator module to perform the function of the host system may include isolating a NUMA node as the host simulator module from a plurality of NUMA nodes of the NUMA architecture.

The allocating of the NUMA node of the NUMA architecture to each of the one or more AXDIMM emulator modules to perform the function of the stream of the AXDIMM architecture may include: isolating a NUMA node from a plurality of NUMA nodes of the NUMA architecture and allocating the isolated NUMA node to an AXDIMM emulator module; isolating a central processing unit (CPU) from the NUMA node configured for the AXDIMM emulator module to serve as an AX accelerator for the AXDIMM emulator module; allocating a reserved memory in the NUMA node configured for the AXDIMM emulator module to an AX memory of the AXDIMM emulator module; and allocating, to an AX buffer of the AXDIMM emulator module, a memory other than the reserved memory in the NUMA node configured for the AXDIMM emulator module and shared level 3 (L3) cache, the AX accelerator may be configured to perform a function of a processing unit of a corresponding stream in the AXDIMM architecture, the AX memory may be configured to implement a function of a dynamic random-access memory (DRAM) array of a corresponding stream in the AXDIMM architecture, and the AX buffer may be configured to implement a caching function.

The method may include: initializing each of the one or more AXDIMM emulator modules to which the NUMA node is allocated; and initializing an AXDIMM device driver.

The initializing of each of the one or more AXDIMM emulator modules to which the NUMA node is allocated may include: mapping an AX memory of a corresponding AXDIMM emulator module to the host simulator module and an AX accelerator of the AXDIMM emulator module; and mapping an AX buffer of the AXDIMM emulator module to the host simulator module and the AX accelerator of the AXDIMM emulator module.

The initializing of the AXDIMM device driver may include: transmitting an address space range of the one or more AXDIMM emulator modules to the AXDIMM device driver through an interaction module comprised in the host simulator module; and modifying an original address space range to the received address space range of the one or more AXDIMM emulator modules, and the address space range of the one or more AXDIMM emulator modules may include address space ranges of the AX memory and the AX buffer.

The executing of the application using the NMP emulator may include: calling the AXDIMM device driver from the application through an application runtime and library; calling the one or more AXDIMM emulator modules based on the modified address space range of the one or more AXDIMM emulator modules from the AXDIMM device driver; and feeding a result of an accelerated computation back to the application from the one or more AXDIMM emulator modules through the application runtime and library.

The executing of the application using the NMP emulator may include performing a function of parallelizing an internal bandwidth of the AXDIMM architecture by using, in parallel, a plurality of memory channels of each NUMA node among a plurality of NUMA nodes of the NUMA architecture.

The AX accelerator may be configured to obtain a function by programming using the isolated CPU and perform the obtained function.

A non-transitory computer-readable storage medium may store instructions that, when executed by one or more processors, configure the one or more processors to perform the method.

In one or more general aspects, an electronic device includes: one or more processors configured to: allocate a non-uniform memory access (NUMA) node of a NUMA architecture to a host simulator module comprised in a NUMA architecture-based near-memory processing (NMP) emulator to perform a function of a host system; allocate a NUMA node of the NUMA architecture to each of one or more acceleration dual in-line memory module (AXDIMM) emulator modules comprised in the NMP emulator to perform a function of a stream of an AXDIMM architecture; and execute an application using the NMP emulator.

The host simulator module may be configured to interact with the one or more AXDIMM emulator modules through an interaction module of the host simulator module.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as will be commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Also, in the description of embodiments, detailed description of structures or functions that are thereby known after an understanding of the disclosure of the present application will be omitted when it is deemed that such description will cause ambiguous interpretation of the embodiments.

Although terms such as "first," "second," and "third," or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The phrases "at least one of A, B, and C," "at least one of A, B, or C," and the like are intended to have disjunctive meanings, and these phrases "at least one of A, B, and C," "at least one of A, B, or C," and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment (for example, as to what an example or embodiment may include or implement) means that at least one example or embodiment exists where such a feature is included or implemented, while all examples are not limited thereto.

Hereinafter, example embodiments will be described in detail with reference to the accompanying drawings. When describing the example embodiments with reference to the accompanying drawings, like reference numerals refer to like components and a repeated description related thereto will be omitted.

Reference numerals used herein may be used only to modify various components regardless of their order and/or importance and distinguish one component from another component without limiting the components in question. For example, node 0 and node 1 are both nodes but are different nodes. In this example, node 0 may also be referred to as node 1, and similarly node 1 may also be referred to as node 0 without departing from the scope of the present disclosure.

A near-memory processing (NMP) technology may be used as hardware for massive data computation. The NMP technology may add a processing unit (e.g., a computing unit, a processor, and/or an accelerator) near a memory to reduce data movement between a central processing unit (CPU) of a host system and a dynamic random-access memory (DRAM), and relieve external bandwidth bottleneck of an application using internal bandwidth parallelism in hardware to improve the application performance. For example, there are various types of NMP (hardware) architecture, including processing in memory (PIM), acceleration dual in-line memory module (AXDIMM), or memory pool-based NMP architectures. These architectures are based on the principle that adding a processing unit near a memory allows an application to use an internal bandwidth of parallel processing more fully and to reduce external memory access.

Figure 1:
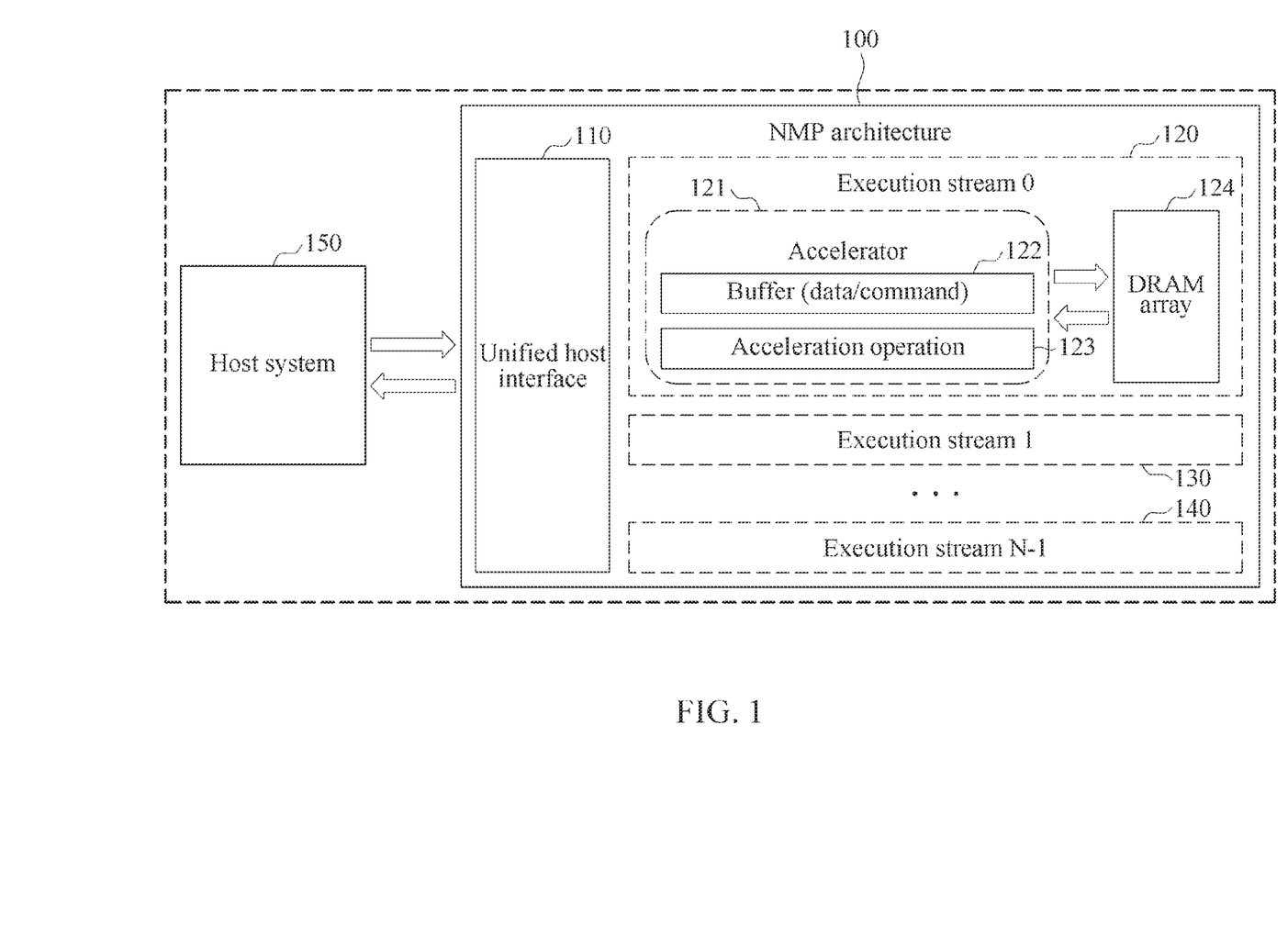
FIG. 1 illustrates an example near-memory processing (NMP) architecture.

FIG. 1 illustrates an example NMP architecture.

Referring to FIG. 1, an NMP architecture 100 may interact with a host system 150 through a unified host interface 110. Inside the NMP architecture 100, there may be a plurality (e.g., N) of parallel execution streams 120, 130, and 140 that have the same internal structure and may independently access a memory and perform corresponding computation processing at the same time.

For example, the execution streams 120, 130, and 140 may each include an accelerator and a DRAM array. For example, the execution stream 120 may include an accelerator 121 and a DRAM array 124, where the accelerator 121 may include a buffer 122 for data and/or commands and may be used to perform an accelerated operation 123, and the DRAM array 124 may have a DRAM storage function.

However, there may be a lack of systems available for the NMP architecture 100, and an NMP emulator (e.g., an emulator apparatus) may thus be used as a main tool for functional verification and performance evaluation of applications. A typical NMP simulation method may be largely divided into a software (S/W)-based simulation method and a field-programmable gate array (FPGA)-based simulation method. As used herein, an "emulator" is hardware that enables a computer system (e.g., a host) to behave like another computer system (e.g., a guest).

The S/W-based simulation method may simulate and implement main functions and operations of hardware, using software. A representative example of a S/W-based emulator may be Ramulator, which is a memory emulator with high clock accuracy and may be used to simulate various DRAM technologies such as high-bandwidth memory (HBM) and hyper memory cube (HMC). However, S/W-based emulators including Ramulator may need to be reconfigured every time a new DRAM technology is introduced, and may require a great amount of time, for example, up to several days or even weeks, for simulation applications in the case of real applications with continuously increasing data sets and may lack rigorous experimental evidence that supports and proves the potential of an NMP technology.

A typical FPGA-based NMP hardware platform may be an AXDIMM, which may perform rapid prototyping and NMP application evaluation on real hardware. An FPGA-based NMP-implemented AXDIMM may have two main features. First, it may support two modes: a general-purpose processing (i.e., general dual in-line memory module (DIMM) processing) mode and a dedicated accelerator mode through a programmable FPGA architecture inside a high-capacity DIMM up-buffer chip. Second, it may expand an internal memory bandwidth through a parallel operation at a multi-rank level and employ near-memory data processing to reduce data movement. The FPGA-based NMP-implemented AXDIMM may significantly improve the performance and energy efficiency of a system. However, the FPGA-based NMP-implemented AXDIMM may have issues such as complex design processes, low observability, low debugging efficiency, poor platform compatibility due to a lack of unified interface standards, and low scalability.

In summary, as shown in Table 1 below, the typical simulation methods may have issues in several aspects. As shown in Table 1 below, the S/W-based simulation method may generally require a great time and have low simulation accuracy, and the hardware FPGA-based simulation method may have limitations in scalability.

TABLE 1

Comparison of typical simulation methods

| Method | Function | Accuracy | Scalability | Performance and overhead |
|---|---|---|---|---|
| S/W-based simulation | Simulation with all functions | Medium | High | Suitable for small application, low performance, low overhead, and slow runtime |
| FPGA-based simulation | Simulation with all functions | High | Limited | Suitable for limited application, high performance, high overhead, and fast runtime |

To solve the preceding issues and others, one or more embodiments of the present disclosure provides an NMP emulator (e.g., Nmulator) apparatus of a non-uniform memory access (NUMA) architecture and its operating method.

The NUMA architecture may refers to a computer architecture of a multiprocessor. A plurality of NUMA nodes in the NUMA architecture may be connected and interact with each other, allowing each CPU to access a memory of the entire system and access a local memory much faster than accessing a remote memory (i.e., a memory on other nodes in the system).

Figure 2:
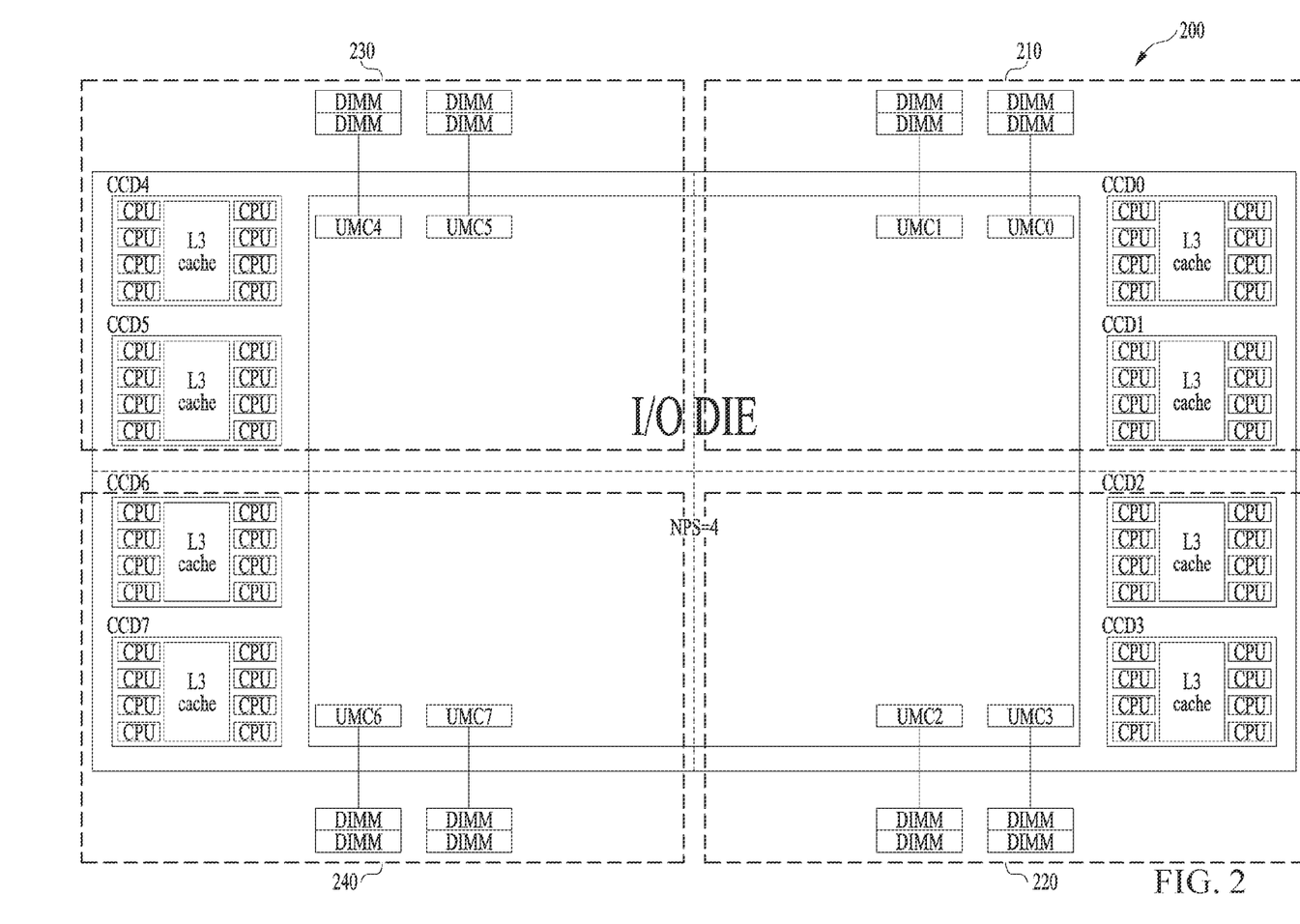
FIG. 2 illustrates an example non-uniform memory access (NUMA) architecture.

FIG. 2 illustrates an example NUMA architecture.

FIG. 2 shows a NUMA architecture 200 of an example processor (e.g., Zen3). Referring to FIG. 2, NPS (e.g., "NPS=4" as shown in FIG. 2) represents the number of NUMA nodes (e.g., NUMA nodes 210, 220, 230, and 240) dividable by the processor, i.e., the example processor may have a total of four NUMA nodes 210, 220, 230, and 240. Each of the NUMA nodes 210, 220, 230, and 240 may have multiple CPU cores (e.g., Zen3), level-3 (L3) caches (e.g., 32 MB shared L3 caches), a peripheral component interconnect express (PCIe) port (not shown) (e.g., PCIe GEN4 slots), and a general messaging interface (GMI) link (not shown). Each of the NUMA nodes 210, 220, 230, and 240 may also include two unified memory controllers (UMCs), each of which may be used as a memory channel. Therefore, all the CPUs in each of the NUMA nodes 210, 220, 230, and 240 may access a memory through a two-channel interleaved mode. When memory access in each of the NUMA nodes 210, 220, 230, and 240 is isolated from another node, communication between two NUMA nodes may be limited by a memory bandwidth that may be provided by a remote NUMA node. This is, however, unnecessary for this present disclosure, and thus descriptions of some components related thereto will be omitted here to avoid ambiguousness.

Hereinafter, an NMP emulator (e.g., Numlator) that is provided herein to overcome the preceding and other issues will be described according to various example embodiments of the present disclosure with reference to the accompanying drawings. However, it should be noted that the example embodiments of the present disclosure are not limited by the following description, and therefore various example embodiments may be applied based on the example embodiments described below.

Figure 3:
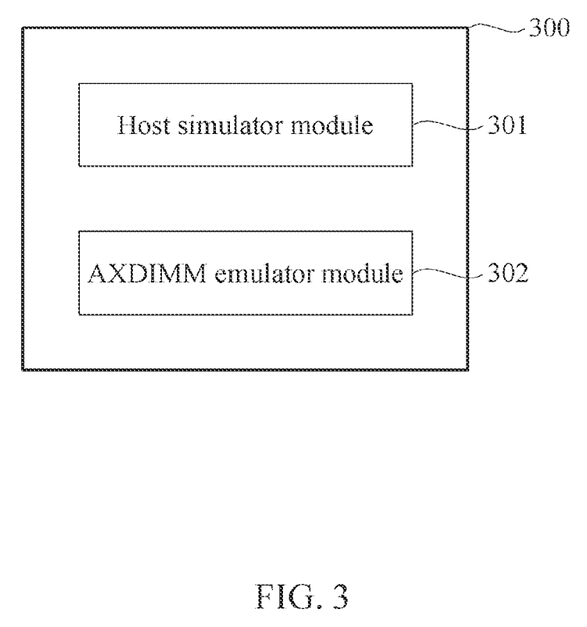
FIG. 3 illustrates an example NUMA architecture based NMP emulator apparatus according to one or more example embodiments.

FIG. 3 illustrates an example NUMA architecture based NMP emulator apparatus according to one or more example embodiments.

A NUMA architecture based NMP emulator apparatus of one or more embodiments may solve an issue of a typical S/W-based simulation method having degrading performance when simulating large-scale applications, and solve an issue of a typical FPGA-based simulation method having a great development burden and degrading scalability. Referring to FIG. 3, a NUMA architecture based NMP emulator apparatus 300 of an example embodiment may include a host simulator module 301 and an AXDIMM emulator module 302 (e.g., one or more AXDIMM emulator modules 302). Additionally, the host simulator module 301 may be configured to perform a function of a host system using a NUMA node in a NUMA architecture, and each of the one or more AXDIMM emulator modules 302 may be configured to perform a function of a stream of an AXDIMM architecture using a NUMA node in the NUMA architecture.

Hereinafter, examples of the NUMA architecture based NMP emulator apparatus 300 shown in FIG. 3 will be described in detail with reference to FIGS. 4 and 5.

Figure 4:
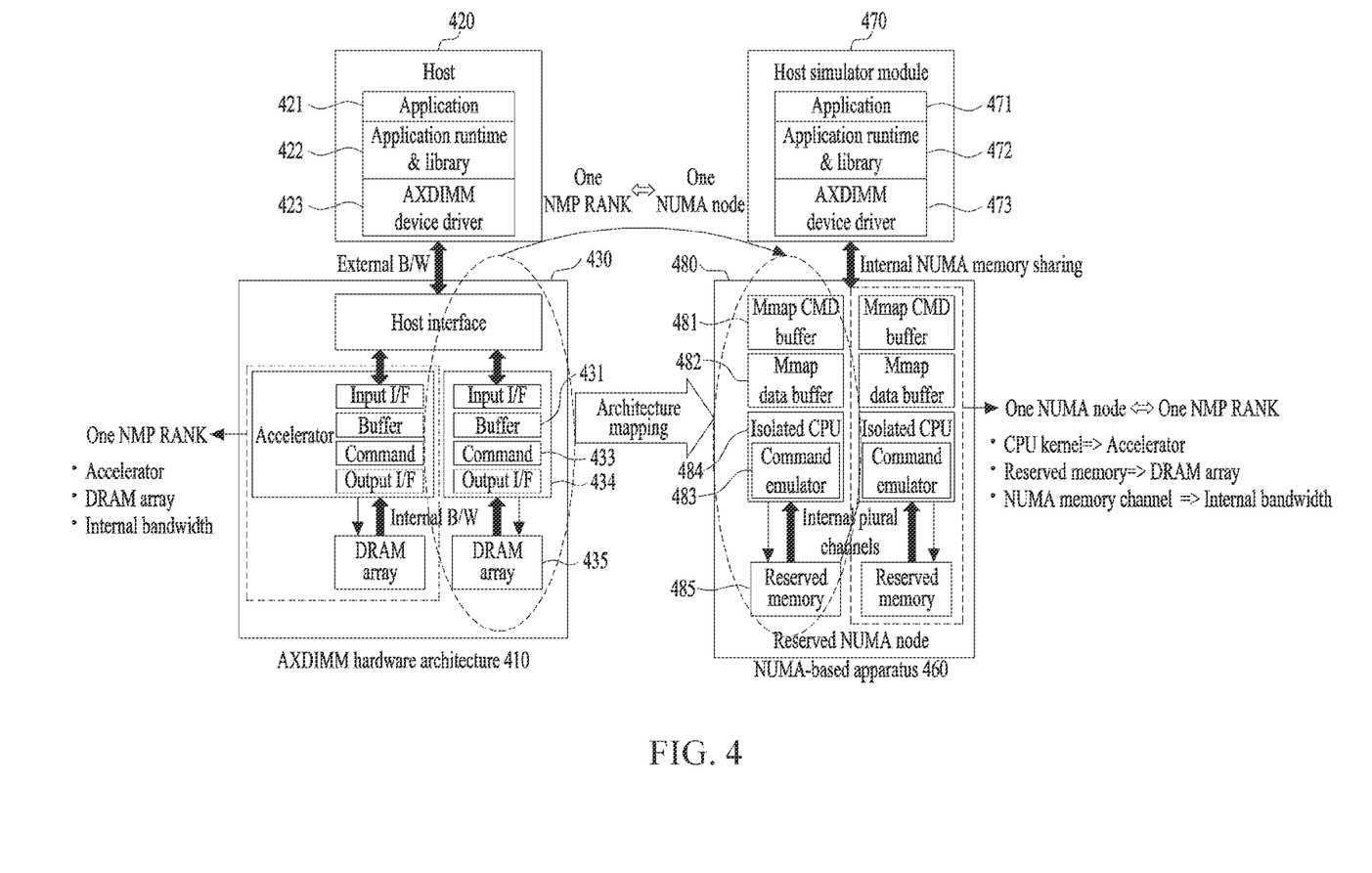
FIG. 4 illustrates an example NUMA architecture based NMP emulator apparatus according to one or more example embodiments.

FIG. 4 illustrates an example NUMA architecture based NMP emulator apparatus according to one or more example embodiments.

Figure 5:
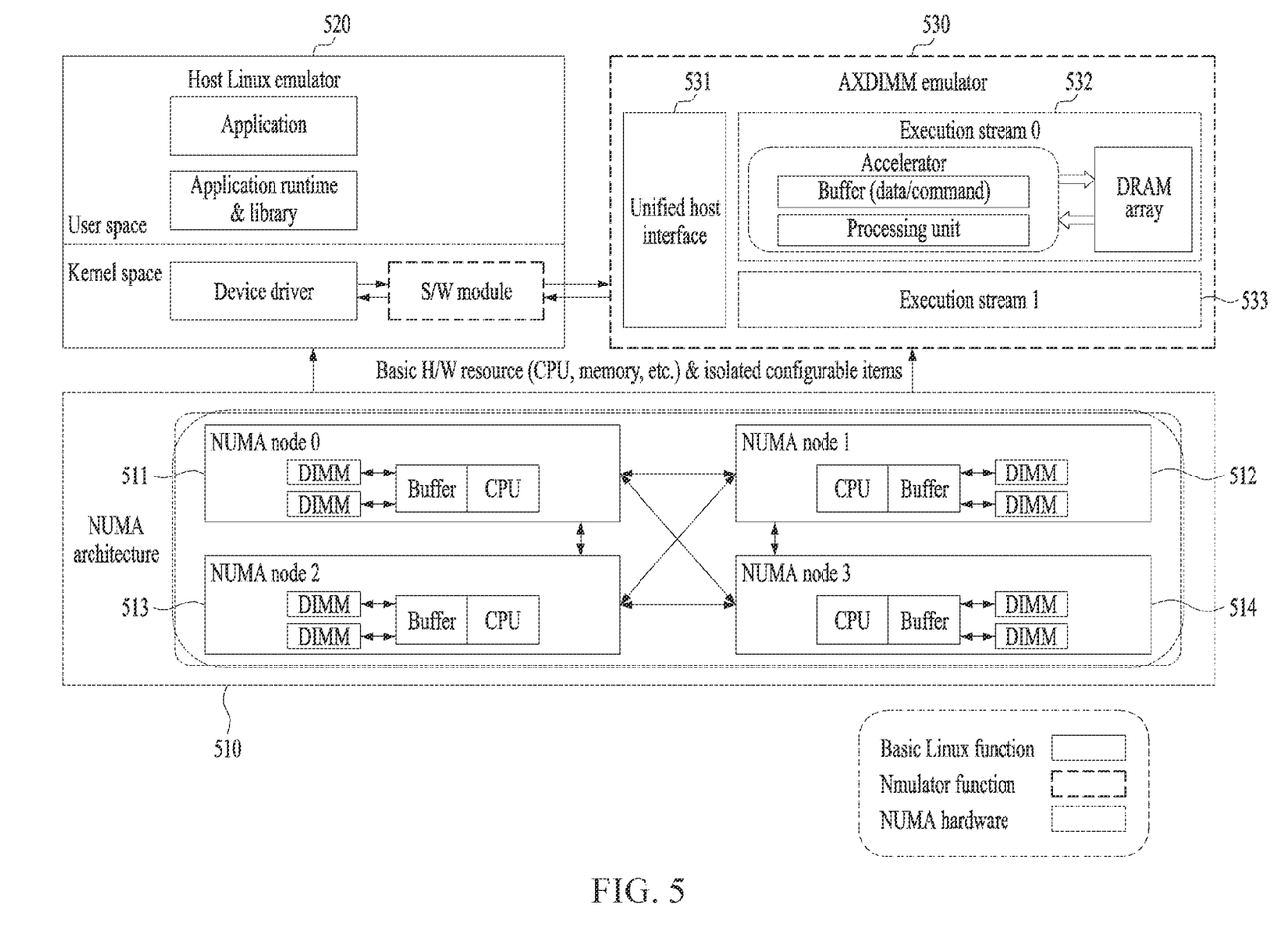
FIG. 5 illustrates an example mapping relationship between an NMP architecture and a NUMA architecture according to one or more example embodiments.

FIG. 5 illustrates an example mapping relationship between an NMP architecture and a NUMA architecture according to one or more example embodiments.

Referring to FIG. 4, a left side shows a configuration of an AXDIMM hardware architecture 410, and a right side shows a configuration of a NUMA architecture based NMP emulator apparatus 460, where the AXDIMM hardware architecture 410 on the left side may have a mapping relationship with the NMP emulator apparatus 460 on the right side.

The AXDIMM hardware architecture 410 (or an AXDIMM acceleration system) may include a host module 420 and an AXDIMM module 430 (e.g., one or more AXDIMM modules 430). The host module 420 may include an application 421, an application runtime and library 422, and an AXDIMM device driver 423. A host simulator module 470 included in the NMP emulator apparatus 460 using a NUMA node of the NUMA architecture may correspond to the host module 420 included in the AXDIMM hardware architecture 410. That is, one NUMA node (e.g., 470) of the NUMA architecture may be mapped to the host module 420 of the AXDIMM hardware architecture 410 to be used to simulate the host module 420 in the AXDIMM acceleration system. Accordingly, the host simulator module 470 for simulating the host module 420 may include an application 471, an application runtime and library 472, and an AXDIMM device driver 473. An Mmap command (CMD) buffer 481 and an Mmap data buffer 482 included in one NUMA node 480 may correspond to a buffer 431 included in the AXDIMM hardware architecture 410. A command emulator module 483 included in the NUMA node 480 may correspond to a command module 433 included in the AXDIMM hardware architecture 410.

Referring to FIG. 5, a bottom box shows a configuration of a NUMA architecture 510 used to implement an NMP emulator. For example, the NUMA architecture 510 for providing hardware (H/W) resources (e.g., CPU, memory, etc.) and individually configurable items may include a total of four NUMA nodes 511, 512, 513, and 514. Although the number of one or more NUMA nodes is shown as four (e.g., 511, 512, 513, and 514), but the number of the NUMA nodes is not limited to four. For example, on condition that an architecture is the NUMA architecture 510, the Linux operating system may run on the NUMA architecture 510, a host simulator module of FIG. 5 may be a host Linux emulator module 520, and the host Linux emulator module 520 may perform a function of a host Linux system using a NUMA node, for example, the NUMA node 511 (e.g., NUMA node 0), of the NUMA architecture 510.

Referring back to FIG. 4, each AXDIMM module 430 may be a running stream (or execution stream). Each stream (e.g., 430) may include an accelerator 434, a DRAM array 435, and an internal bandwidth (B/W). Each AXDIMM simulator module included in the NUMA architecture based NMP emulator apparatus 460 may implement a corresponding stream using one NUMA node 480. That is, one or more NUMA nodes 480 reserved in the NUMA architecture may each be mapped to a corresponding stream to be used to simulate the stream in the AXDIMM acceleration system. That is, the accelerator 434 of the AXDIMM module 430 may correspond to an isolated CPU 484 of the NUMA node 480, the DRAM array 435 of the AXDIMM module 430 may correspond to a reserved memory 485 of the NUMA node 480, and the internal bandwidth of the AXDIMM module 430 may correspond to a plurality of internal channels of the NUMA node 480.

Accordingly, as shown in FIG. 5, an AXDIMM emulator module 530 may include a unified host interface 531 and two execution streams 532 and 533. The execution streams 532 and 533 may each represent an AXDIMM emulator module including an accelerator and a DRAM array, where the accelerator may include a buffer for data and/or commands and a processing unit (or computing unit). For example, of the execution streams 532 and 533, execution stream 0 532 may perform a function of a corresponding stream using NUMA node 1 512, and execution stream 1 533 may perform a function of a corresponding stream using NUMA node 2 513. As described with this example, the NUMA nodes 512 and 513 of the NUMA architecture 510 may be used to perform the functions of the execution streams 532 and 533 of the AXDIMM architecture (e.g., the AXDIMM emulator module 530). For example, the processing units included in the accelerators of the execution streams 532 and 533 may be used to implement computation (or calculation) or processing functions, the buffers included in the accelerators of the execution streams 532 and 533 may be used to implement a caching function, and the DRAM arrays may be used to implement a storage function.

In this case, a processing unit of an accelerator may have the computational function and a DRAM array as a memory may have the storage function, and thus an accelerator AXDIMM module of one or more embodiments in which the processing unit is added near the memory may implement NMP that allows the processing unit to perform a portion of computational processing while a host computer is performing a portion of computational processing or allows only the processing unit to perform a portion of the entire computational processing. This may allow a typical memory without a processing unit to transmit only data and/or commands necessary for all computation/processing to a host through an interface, while avoiding complex processing that performs a great amount of computation or calculation in the host, thereby improving a computational speed and accelerating the computation/processing.

Although the number of one or more AXDIMM modules is shown as two in FIGS. 4 and 5, the number of the AXDIMM modules is not limited to two.

Additionally, a host simulator module may include an interaction module configured to enable an interaction between the host simulator module and one or more AXDIMM emulator modules, which may be implemented as a software module, for example, the S/W module of FIG. 5. For example, the interaction module may be used for an interaction between the host Linux emulator module 520 and the AXDIMM emulator module 530. For example, the interaction module may be connected to the unified host interface 531 of the AXDIMM emulator module 530 and the AXDIMM device driver of the host Linux emulator module 520. That is, the present disclosure may implement an interaction between a host simulator module and one or more AXDIMM emulator modules through such an interaction module. The interaction module described herein may correspond to a bridge between the host simulator module and the AXDIMM emulator modules, and may be used to multiplex an AXDIMM device driver included in the host simulator module and transfer data between the host simulator module and the AXDIMM emulator modules, which will be described in detail below.

Additionally, each of the one or more AXDIMM emulator modules may include an AX accelerator, an AX memory, and an AX buffer. Additionally, the AX accelerator may be configured to perform a function of a processing unit of a corresponding stream in the AXDIMM architecture using an isolated CPU in a corresponding NUMA node. Additionally, the AX memory may be configured to perform a function of a DRAM array of a corresponding stream in the AXDIMM architecture using a reserved memory in a corresponding NUMA node. Additionally, the AX buffer may be configured to implement a caching function using a memory other than the reserved memory of the NUMA node and a shared L3 cache.

For example, an initialization stage for a NUMA architecture based NMP emulator apparatus may isolate a NUMA node from a plurality of NUMA nodes of the NUMA architecture such that it is to be used as a host simulator module and then isolate one or more NUMA nodes from the plurality of NUMA nodes of the NUMA architecture such that they are to be used as one or more AXDIMM emulator modules, in order to prevent occupancy of the NUMA nodes and avoid collisions during the initialization stage, thereby completing resource allocation. For example, referring to FIG. 5, NUMA node 0 511 may be isolated to be provided to the host emulator module 520 to simulate the host Linux system, and NUMA node 1 512 and NUMA node 2 513 may be isolated for execution stream 0 532 and execution stream 1 533, respectively.

When, in a NUMA architecture system, resources such as a CPU and a memory are shared throughout the system, proper simulation of an AXDIMM module may be achieved through the isolation of a predetermined CPU or the reservation of a predetermined amount of memory to be used as a corresponding module in an AXDIMM emulator module. That is, an AXDIMM module may be simulated using a NUMA node, and to prevent resources such as a CPU or memory of the simulated AXDIMM module from being used, the CPU may be isolated in advance and a predetermined memory may be reserved during the initialization stage. For example, the CPU isolated to the NUMA node in the initialization stage may be used to simulate a processing unit of a corresponding stream in the AXDIMM hardware architecture, and the memory reserved in the NUMA node in the initialization stage may be used to simulate a corresponding memory in the AXDIMM hardware architecture. In addition, the initialization stage may implement a caching function by allocating a memory other than the memory reserved for simulation and a L3 cache for an AX buffer. This may prevent an occupancy collision by using only reserved hardware resources to be used as the simulated AXDIMM module such that, during the execution of the system, a kernel does not reserve a task in a CPU of the simulated AXDIMM module and does not store data or commands in a memory of the simulated AXDIMM module.

Additionally, each of the one or more AXDIMM emulator modules may be configured to parallelize internal bandwidths of corresponding streams in the AXDIMM architecture using a plurality of NUMA memory channels in a corresponding NUMA node Referring to FIG. 4, the parallelization of an internal bandwidth of a corresponding stream in the NUMA architecture based NUMA-based emulator apparatus 460 may be performed in parallel, using a plurality of NUMA memory channels in each AXDIMM emulator module allocated to the NUMA node 480 of the NUMA architecture.

Hereinafter, the description will continue with an example provided with reference to FIG. 6.

Figure 6:
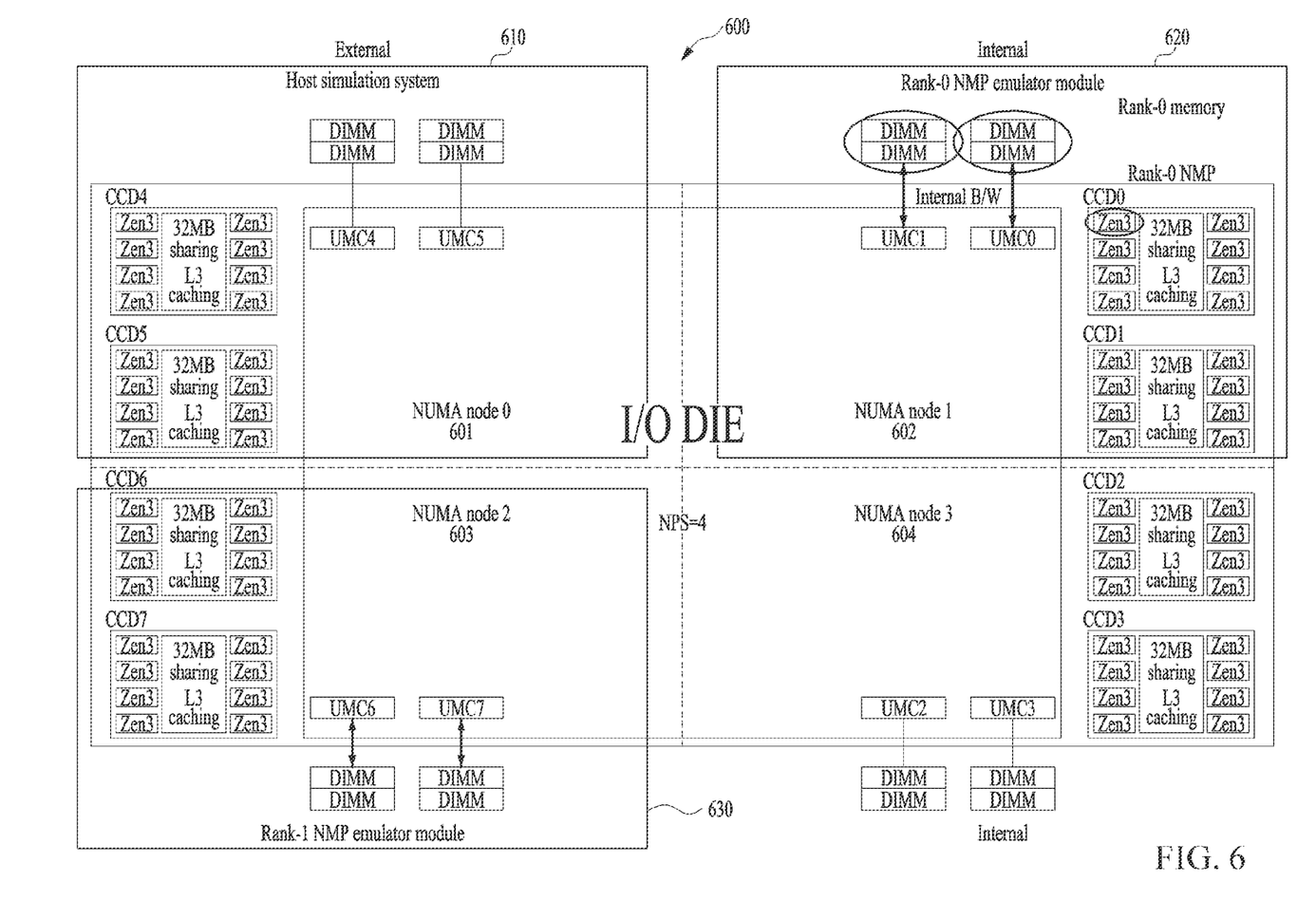
FIG. 6 illustrates an example NUMA architecture based NMP emulator apparatus according to one or more example embodiments.

FIG. 6 illustrates an example NUMA architecture based NMP emulator apparatus according to one or more embodiments.

For example, FIG. 6 shows an example NUMA architecture based NMP emulator apparatus for simulating an example AXDIMM hardware architecture according to an example embodiment. Referring to FIG. 6, an example AXDIMM hardware architecture 600 of an example embodiment may include a host 610 and two execution streams (e.g., rank-0 NMP emulator module 620 corresponding to rank-0 NMP in Table 2 and rank-1 NMP emulator module 630 corresponding to rank-1 NMP in Table 2), where the host 610 may include an internal bandwidth, and each of the execution streams 620 and 630 may include a corresponding processing unit, memory, and internal bandwidth. A mapping relationship between the AXDIMM hardware architecture and the NUMA architecture based NMP emulator apparatus of FIG. 6 is indicated in Table 2 below.

TABLE 2

Mapping relationship between AXDIMM hardware architecture and NUMA-based architecture server

| AXDIMM architecture | NUMA architecture-based server |
|---|---|
| Host 610 | NUMA node 0 601 |
| Internal bandwidth | Two memory channels with one Zen3 of NUMA node 0 601 accessing DIMM of NUMA node 1 602 or NUMA node 2 603 |
| Rank-0 NMP 620 | NUMA node 1 602 |
| Rank-0 processing unit | One Zen3 CPU of NUMA node 1 602 |
| Rank-0 memory | DIMM of NUMA node 1 602 |
| Internal bandwidth | Two memory channels with one Zen3 of NUMA node 1 602 accessing DIMM of NUMA node 1 602 |

TABLE 2-continued

Mapping relationship between AXDIMM hardware architecture and NUMA-based architecture server

| AXDIMM architecture | NUMA architecture-based server |
|---|---|
| Rank-1 NMP 630 | NUMA node 2 603 |
| Rank-1 processing unit | One Zen3 CPU of NUMA node 2 603 |
| Rank-0 memory | DIMM of NUMA node 2 603 |
| Internal bandwidth | Two memory channels with one Zen3 of NUMA node 2 603 accessing DIMM of NUMA node 2 603 |

Referring to FIG. 6 and Table 2, it may be verified from this example that the Zen3 CPU of the NUMA nodes 602 and 603 corresponds to an isolated CPU, and the DIMM of the NUMA nodes 602 and 603 corresponds to a reserved memory.

In the case of a typical memory without a processing unit, a host accesses the memory only through an external bandwidth (B/W) that is determined by a pin between the host and the memory. In contrast, in the case of a memory with a parallel processing unit, because there is also an internal bandwidth in addition to the external bandwidth, i.e., a specific number of parallel internal bandwidths when there is a specific number of ranks (or streams), an important feature of the AXDIMM hardware architecture that it is twice the internal bandwidth may be realized. In an example embodiment, to simulate such a feature, a memory channel of a NUMA node may be used to simulate an internal bandwidth. For NUMA node 1 602 of FIG. 6 as an example, Zen3 of a charge coupled device (CCD) may be a CPU core, and when Zen3 accesses a DRAM module (i.e., DIMM of FIG. 6), Zen3 may pass two memory channels (in this case, a single unified memory controller of FIG. 6 corresponds to one internal channel) to access the DRAM. That is, the two internal channels may be used to simulate one internal bandwidth of the AXDIMM hardware architecture in a current NUMA node.

In addition, outside the NUMA nodes 601, 602, 603, and 604, only one of the NUMA nodes 601, 602, 603, and 604, i.e., one rank, may be accessed simultaneously at a time due to hardware limitations, and two memory channels may be present in each of the NUMA nodes 601, 602, 603, and 604, and thus an effect that the internal bandwidth is twice the external bandwidth may be realized. The processing method described above may be provided only as an example, and the number of external bandwidths, internal bandwidths, and internal channels is not limited. That is, proportionally simulating the internal bandwidth using multiple memory channels by the NUMA nodes 601, 602, 603, and 604 may achieve the effect of doubling the internal bandwidth and may implement the NMP bandwidth expansion.

In general, implementing some functions or commands using a hardware architecture may require corresponding hardware support and a corresponding firmware program. That is, in the case of implementing a function using a buffer and a register in the hardware architecture or implementing a command using the hardware architecture, the hardware architecture may require a corresponding hardware module.

In the NUMA architecture based NMP emulator apparatus of an example embodiment, a corresponding function may be performed by executing it on a CPU in a NUMA node. Additionally, an AX accelerator of an example embodiment may be configured to obtain a function through programming using an isolated CPU and perform the obtained function. For example, it may determine a function having a corresponding feature through programming on the CPU, and execute the feature by implementing the determined function. Therefore, the NUMA architecture based NMP emulator apparatus may readily support new functions (or features) by implementing a function, that is, a new NMP hardware command may only need to be rapidly expanded through configurable and highly scalable CPU software programming.

In addition, the scalability of the NUMA architecture based NMP emulator apparatus of an example embodiment may reflect both the scalability in terms of functions and the scalability that is not to the number of nodes or streams, and the NMP emulator apparatus may be flexibly constructed to configure NUMA nodes to simulate the AXDIMM hardware architecture having an arbitrary number of streams. That is, the AXDIMM hardware architecture of an example embodiment is provided only as an example, and another type of AXDIMM hardware architecture may include arbitrary other types such as, for example, a compute express link-AXDIMM (CXL-AXDIMM) and a data management platform-AXDIMM (DMP-AXDIMM). In this way, expanding the number of NUMA nodes may expand simulation to a higher level of parallel NMP hardware, and may more effectively support various types of AXDIMM hardware architectures and reduce development costs.

According to an example embodiment of the present disclosure, hardware simulation may be rapidly implemented through configuration and software programming, and all simulations (including command simulation) may be executed. As a result, applications may perform complete system simulations with hardware-level performance by running large data sets in the NMP emulator (Nmulator) apparatus having similar performance to real hardware performance.

Hereinafter, a method of operating a NUMA architecture based NMP emulator apparatus according to an example embodiment of the present disclosure will be described. The NMP emulator apparatus described herein and hereinafter may be an NMP emulator apparatus based on various example embodiments described above.

Figure 7:
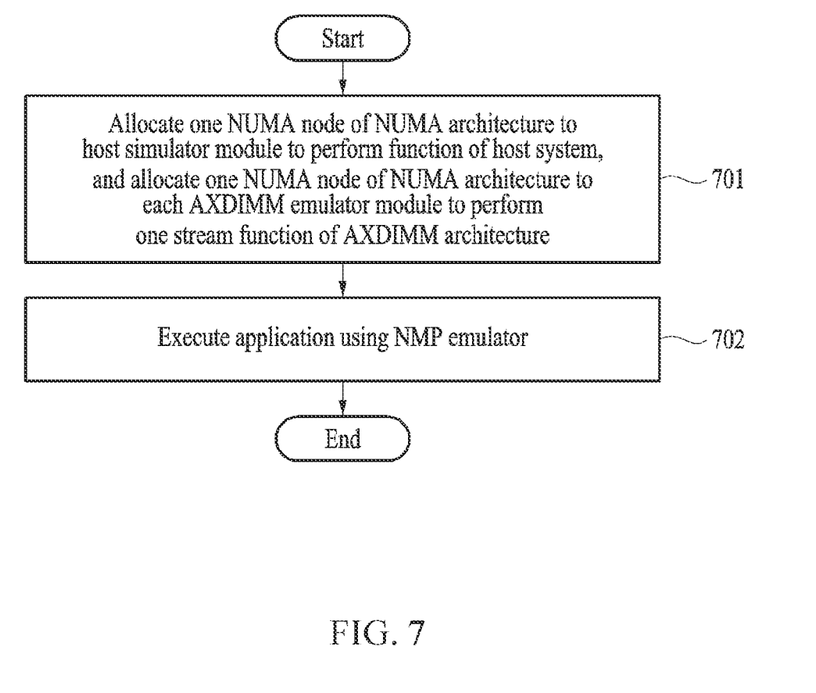
FIG. 7 illustrates an example method of operating a NUMA architecture based NMP emulator apparatus according to one or more example embodiments.

FIG. 7 illustrates an example method of operating a NUMA architecture based NMP emulator apparatus according to one or more example embodiments. While the operations of FIG. 7 may be performed in the shown order and manner, the order of one or more of the operations may be changed, one or more of the operations may be omitted, and/or one or more of the operations may be performed in parallel or simultaneously, without departing from the spirit and scope of the shown examples.

Figure 8:
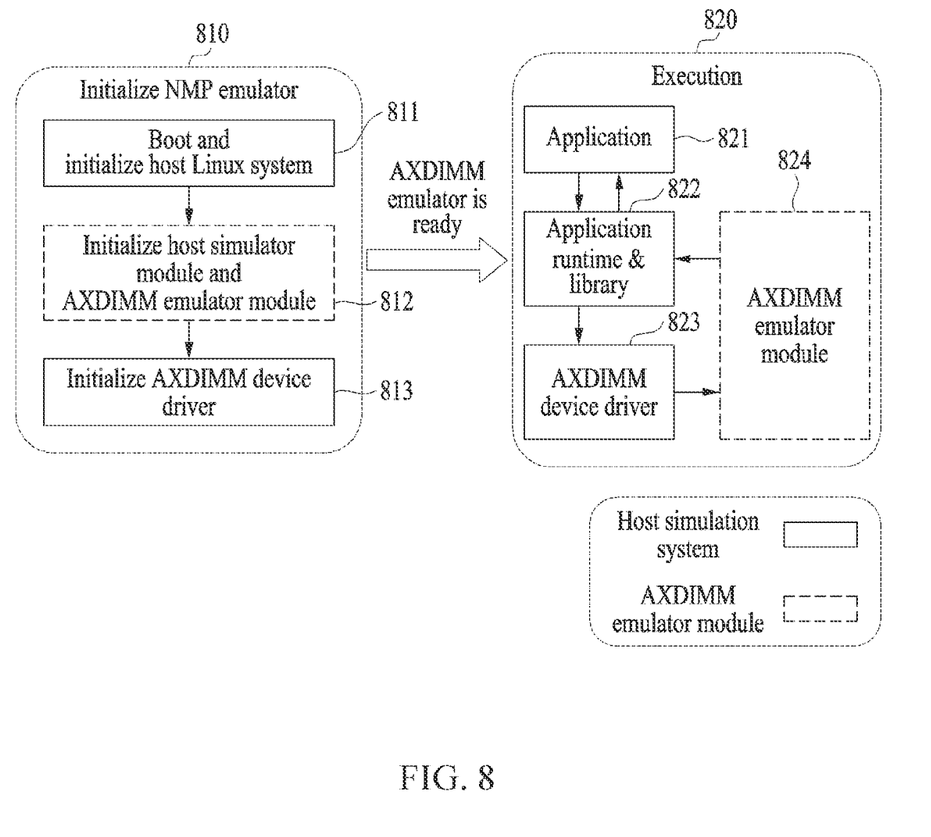
FIG. 8 illustrates an example method of executing a NUMA architecture based NMP emulator apparatus according to one or more example embodiments.

FIG. 8 illustrates an example method of executing a NUMA architecture based NMP emulator apparatus according to one or more example embodiments.

The NUMA architecture based NMP emulator apparatus may include a host simulator module and one or more AXDIMM emulator modules.

Referring to FIG. 7, the operating method according to an example embodiment may include operation 701 of allocating a NUMA node of a NUMA architecture to a host simulator module to perform a function of a host system; and allocating a NUMA node of the NUMA architecture to each AXDIMM emulator module to perform a function of a stream of an AXDIMM architecture. In this case, the host simulator module may interact with one or more multiple AXDIMM emulator modules through an interaction module of the host simulator module. Operation 701 will be described in detail below with reference to FIG. 8.

Referring to FIG. 8, the operating method according to an example embodiment may include operation 810 of initializing the NMP emulator apparatus. For example, it may include operation 811 of booting and initializing a system (or a host Linux system) of the NUMA architecture. For example, the system may first be powered on and execute an input/output system (BIOS), perform a power-on self-test (POST) to search for hardware and check hardware availability, generate an advanced configuration and power interface (ACPI) table (of which a system locality information table (SLIT) included in the ACPI table is dedicated to the NUMA architecture) that describes system resources in a Linux kernel, load a system kernel image, and boot Linux. In this case, the host Linux system may begin to control system resources.

Referring to FIG. 8, operation 810 of initializing the NMP emulator apparatus may include operation 812 of initializing the host simulator module and the AXDIMM emulator module. For example, the operating method may include allocating a NUMA node of the NUMA architecture to the host simulator module to perform a function of a host system, and allocating a NUMA node of the NUMA architecture to each AXDIMM emulator module to perform a function of a stream of the AXDIMM architecture.

Additionally, such an operation of allocating of a NUMA node of the NUMA architecture to the host simulator module may include an operation of isolating a NUMA node from a plurality of NUMA nodes of the NUMA architecture as the host simulator module. Additionally, the operation of isolating a NUMA node from a plurality of NUMA nodes of the NUMA architecture as the host simulator module may include isolating a CPU of the NUMA node from a general-purpose scheduler using an "isolcpus" command and reserving, in the NUMA node, a memory area other than a memory area used by a kernel, using a "mem" command.

Additionally, the operation of allocating a NUMA node of the NUMA architecture to each AXDIMM emulator module may include an operation of isolating a NUM node from a plurality of NUM nodes of the NUM architecture and using the isolated NUM node as an AXDIMM emulator module, and an operation of isolating a CPU from a NUMA node configured for one AXDIMM emulator module to act as an AX accelerator for the AXDIMM emulator module.

In addition, it may include an operation of allocating a reserved memory in the NUMA node configured for the AXDIMM emulator module as an AX memory of the AXDIMM emulator module, and an operation of allocating a memory other than the reserved memory in the NUMA node configured for the AXDIMM emulator module and a shared L3 cache to an AX buffer of the AXDIMM emulator module. In this case, the AX accelerator may be configured to perform a function of a processing unit of a corresponding stream in the AXDIMM architecture, the AX memory may be configured to implement a function of a DRAM array of the corresponding stream in the AXDIMM architecture, and the AX buffer may be configured to perform a caching function.

For example, the operating method may configure booting items in the system kernel (e.g., Linux kernel) to isolate a CPU and reserve a memory. Additionally, the operating method may use the "isolcpus" command to isolate the CPU from the NUMA node such that it is to be used to simulate the processing unit of the AXDIMM module. That is, the AX accelerator may be isolated by the "isolcpus" command. Additionally, the memory of the NUMA node may be reserved to be used to simulate the DRAM array of the AXDIMM module using the "mem" command. That is, a memory area of the AX memory may be reserved using the "mem" command. Additionally, a buffer, i.e., the AX buffer, may be allocated to the AX accelerator in the NUMA node, excluding the AX memory and the memory reserved for the shared L3 cache.

Additionally, the AX accelerator may be configured to perform a function by obtaining the function through programming using the isolated CPU. Details related to that processing have been described above and will not be repeated here.

Additionally, the operating method may include operation 812 of initializing each AXDIMM emulator module to which a NUMA node is allocated and operation 813 of initializing an AXDIMM device driver.

Additionally, the operation of initializing each AXDIMM emulator module to which a NUMA node is allocated may include an operation of mapping an AX memory to the host simulator module and an AX accelerator of a corresponding AXDIMM emulator module, and an operation of mapping an AX buffer to the host simulator module and the AX accelerator of the AXDIMM emulator module.

For example, when the AX memory is reserved to be used to simulate a DRAM array of the AXDIMM module, the host simulator module and the AX accelerator may not recognize unknown AX memory and therefore may not access the reserved AX memory. Additionally, in the operating method, when the AX memory is mapped to the host simulator module and the AX accelerator using a "memremap" function, the host simulator module and the AX accelerator may recognize the AX memory and perform a corresponding storage function. Similarly, in the operating method, when the AX buffer is mapped to the host simulator module and the AX accelerator using the "memremap" function, the host simulator module and the AX accelerator may recognize the AX buffer and activate it to perform a corresponding caching function.

In addition, the operating method may include an operation of calling the isolated CPU from the NUMA node using a "taskset" command.

Additionally, the operation of initializing each AXDIMM emulator module to which a NUMA node is allocated may further include an operation of starting a thread for a runtime service. For example, the operating method may start the thread through the "taskset" command of Linux and execute the thread on the AX accelerator. Additionally, the operating method may accept an acceleration request from an application, generate an NMP command, execute the NMP command, execute acceleration, and record a result of the acceleration in the AX buffer.

Referring to FIG. 8, operation 813 of initializing the AXDIMM device driver may include an operation of transmitting, to the AXDIMM device driver, an address space range of the one or more AXDIMM emulator modules through the interaction module included in the host simulator module, and an operation of modifying an original address space range to the received address space range of the one or more AXDIMM emulator modules. In this case, the address space range of the one or more AXDIMM emulator modules may include address space ranges of the AX memory and the AX buffer.

For example, in the AXDIMM hardware architecture, when the system boots, addresses of the AXDIMM modules may be mapped in advance. That is, a device driver of the AXDIMM module may operate using a reserved address range. However, according to example embodiments of the present disclosure, a simulation function may need to be performed as the AX memory is reserved in advance and the AX buffer is allocated from the memory, and thus an address range to be actually used may be frequently different from the original address range, and the AXDIMM device driver of the host simulator module may not be able to determine which of the address ranges of the AXDIMM emulator module will operate. According to example embodiments of the present disclosure, the address space range of the one or more AXDIMM emulator modules may be transmitted to the AXDIMM device driver through the interaction module in the host simulator module. In this case, the address space range of the one or more AXDIMM emulator modules may include an address space range of the AX memory and an address space range of the AX buffer, and the interaction module may be implemented as a software module, such as, the S/W module shown in FIG. 5. The AXDIMM device driver may modify the original address space range to a new address space range such that each module may accurately perform a corresponding operation. In this way, the previous AXDIMM device driver may be reused using the interaction module, and when the AXDIMM emulator module changes, the previous invalid address space range may not be used to operate, but the latest updated AXDIMM emulator module may operate without any modification. Therefore, the operating method may rapidly perform hardware simulation through configuration and software programming based on the latest NUMA architecture hardware execution function without hardware modifications.

Referring back to FIG. 7, the operating method may include operation 702 of executing an application using the NMP emulator.

Additionally, operation 702 of executing the application using the NMP emulator module may include an operation of calling an AXDIMM device driver 823 from an application 821 through an application runtime and library 822, an operation of calling corresponding one or more AXDIMM emulator modules 824 from the AXDIMM device driver 823 based on a modified address space range of the one or more AXDIMM emulator modules 824, an operation of transmitting a result of an accelerated computation from the one or more AXDIMM emulator modules 824 to the application runtime and library 822, and an operation of feeding a result of the accelerated computation back to the application 821 from the application runtime and library 822.

For example, a runtime may refer to a time used to execute (or run) an application on an emulator after an AXDIMM emulator module is ready. During the execution of the application, the application may call an application runtime and library to call an AXDIMM device driver, and the AX device driver may activate an AX accelerator using a modified address space range. That is, a portion of the application may be executed on the AX accelerator, facilitating computation acceleration.

Additionally, operation 702 of executing the application using the NMP emulator may include an operation of performing a function of parallelizing an internal bandwidth of the AXDIMM architecture using a plurality of memory channels for each of a plurality of NUMA nodes of the NUMA architecture. A description of the details relating to such processing is provided above and will not be repeated here.

The method of operating the NUMA architecture based NMP emulator apparatus according to an example embodiment has been described in detail with reference to corresponding example embodiments of the NUMA architecture based NMP emulator apparatus, and will not be described in further detail here. In addition, the present disclosure may further provide an electronic device. The electronic device according to an example embodiment may include at least one processor and at least one memory storing computer-executable instructions. When executed by the at least one processor, the computer-executable instructions may cause the at least one processor to execute the method of operating the NUMA architecture based NMP emulator apparatus described herein.

In addition, the present disclosure may further provide a computer-readable storage medium. The computer-readable storage medium according to an example embodiment may cause at least one processor to execute the method of operating the NUMA architecture based NMP emulator apparatus described herein when an instruction of the computer-readable storage medium is executed by the at least one processor.

In addition, various features and advantages that can be understood directly or indirectly through the present disclosure may be provided.

The NMP architectures, host systems, unified host interfaces, parallel execution streams, accelerators, DRAM arrays, buffers, NUMA architectures, NUMA nodes, NUMA architecture based NMP emulator apparatuses, host simulator modules, AXDIMM emulator modules, AXDIMM hardware architectures, host modules, AXDIMM modules, AXDIMM device drivers, command modules, Mmap CMD buffers, Mmap data buffers, command emulator modules, isolated CPUs, reserved memories, host Linux emulator modules, execution streams, hosts, NMP emulator modules, rank-0 NMP emulator modules, rank-1 NMP emulator modules, NMP architecture 100, host system 150, unified host interface 110, parallel execution streams 120, 130, and 140, accelerator 121, DRAM array 124, buffer 122, NUMA architecture 200, NUMA nodes 210, 220, 230, and 240, NUMA architecture based NMP emulator apparatus 300, host simulator module 301, AXDIMM emulator module 302, AXDIMM hardware architecture 410, host module 420, AXDIMM module 430, AXDIMM device driver 423, buffer 431, command module 433, accelerator 434, DRAM array 435, NMP emulator apparatus 460, host simulator module 470, AXDIMM device driver 473, NUMA node 480, Mmap CMD buffer 481, Mmap data buffer 482, command emulator module 483, isolated CPU 484, reserved memory 485, NUMA architecture 510, NUMA nodes 511, 512, 513, and 514, host Linux emulator module 520, AXDIMM emulator module 530, unified host interface 531, execution streams 532 and 533, AXDIMM hardware architecture 600, host 610, rank-0 NMP emulator module 620, rank-1 NMP emulator module 630, and other apparatuses, devices, units, modules, and components disclosed and described herein with respect to FIGS. 1-8 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A non-uniform memory access (NUMA) architecture-based near-memory processing (NMP) emulator apparatus, the apparatus comprising:
    a host simulator module configured to perform a function of a host system using a non-uniform memory access (NUMA) node of a NUMA architecture; and
    one or more acceleration dual in-line memory module (AXDIMM) emulator modules, wherein each of the one or more AXDIMM emulator modules is configured to perform a function of a stream of an AXDIMM architecture using a NUMA node of the NUMA architecture.

2. The apparatus of claim 1, wherein the host simulator module comprises an interaction module configured to implement an interaction between the host simulator module and the one or more AXDIMM emulator modules.

3. The apparatus of claim 1, wherein each of the one or more AXDIMM emulator modules is configured to perform a function of parallelizing an internal bandwidth of a corresponding stream of the AXDIMM architecture by using a plurality of NUMA memory channels of a corresponding NUMA node in parallel.

4. The apparatus of claim 1, wherein each of the one or more AXDIMM emulator modules comprises:
    an acceleration (AX) accelerator configured to perform a function of a processing unit of a corresponding stream of the AXDIMM architecture by using an isolated central processing unit (CPU) of a corresponding NUMA node;
    an AX memory configured to implement a function of a dynamic random-access memory (DRAM) array of the stream of the AXDIMM architecture by using a reserved memory of the NUMA node; and
    an AX buffer configured to implement a caching function using a memory other than the reserved memory of the NUMA node and a shared level 3 (L3) cache.

5. The apparatus of claim 4, wherein the AX accelerator is configured to obtain a function by programming using the isolated CPU and perform the obtained function.

6. A processor-implemented method, the method comprising:
    allocating a non-uniform memory access (NUMA) node of a NUMA architecture to a host simulator module of a near-memory processing (NMP) emulator to perform a function of a host system;
    allocating a NUMA node of the NUMA architecture to each of one or more acceleration dual in-line memory module (AXDIMM) emulator modules of the NMP emulator to perform a function of a stream of an AXDIMM architecture; and
    executing an application using the NMP emulator.

7. The method of claim 6, wherein the host simulator module is configured to interact with the one or more AXDIMM emulator modules through an interaction module of the host simulator module.

8. The method of claim 6, wherein the allocating of the NUMA node of the NUMA architecture to the host simulator module to perform the function of the host system comprises isolating a NUMA node as the host simulator module from a plurality of NUMA nodes of the NUMA architecture.

9. The method of claim 6, wherein
    the allocating of the NUMA node of the NUMA architecture to each of the one or more AXDIMM emulator modules to perform the function of the stream of the AXDIMM architecture comprises:
        isolating a NUMA node from a plurality of NUMA nodes of the NUMA architecture and allocating the isolated NUMA node to an AXDIMM emulator module;

isolating a central processing unit (CPU) from the NUMA node configured for the AXDIMM emulator module to serve as an AX accelerator for the AXDIMM emulator module;

allocating a reserved memory in the NUMA node configured for the AXDIMM emulator module to an AX memory of the AXDIMM emulator module; and allocating, to an AX buffer of the AXDIMM emulator module, a memory other than the reserved memory in the NUMA node configured for the AXDIMM emulator module and shared level 3 (L3) cache, the AX accelerator is configured to perform a function of a processing unit of a corresponding stream in the AXDIMM architecture, the AX memory is configured to implement a function of a dynamic random-access memory (DRAM) array of a corresponding stream in the AXDIMM architecture, and the AX buffer is configured to implement a caching function.

10. The method of claim 9, further comprising:
initializing each of the one or more AXDIMM emulator modules to which the NUMA node is allocated; and
initializing an AXDIMM device driver.

11. The method of claim 10, wherein the initializing of each of the one or more AXDIMM emulator modules to which the NUMA node is allocated comprises:
mapping an AX memory of a corresponding AXDIMM emulator module to the host simulator module and an AX accelerator of the AXDIMM emulator module; and
mapping an AX buffer of the AXDIMM emulator module to the host simulator module and the AX accelerator of the AXDIMM emulator module.

12. The method of claim 10, wherein
the initializing of the AXDIMM device driver comprises:
transmitting an address space range of the one or more AXDIMM emulator modules to the AXDIMM device driver through an interaction module comprised in the host simulator module; and
modifying an original address space range to the received address space range of the one or more AXDIMM emulator modules, and
the address space range of the one or more AXDIMM emulator modules comprises address space ranges of the AX memory and the AX buffer.

13. The method of claim 12, wherein the executing of the application using the NMP emulator comprises:
calling the AXDIMM device driver from the application through an application runtime and library;
calling the one or more AXDIMM emulator modules based on the modified address space range of the one or more AXDIMM emulator modules from the AXDIMM device driver; and
feeding a result of an accelerated computation back to the application from the one or more AXDIMM emulator modules through the application runtime and library.

14. The method of claim 9, wherein the AX accelerator is configured to:
obtain a function by programming using the isolated CPU and perform the obtained function.

15. The method of claim 6, wherein the executing of the application using the NMP emulator comprises performing a function of parallelizing an internal bandwidth of the AXDIMM architecture by using, in parallel, a plurality of memory channels of each NUMA node among a plurality of NUMA nodes of the NUMA architecture.

16. A non-transitory computer-readable storage medium storing instructions that, when executed by one or more processors, configure the one or more processors to perform the method of claim 6.

17. An electronic device, comprising:
one or more processors configured to:
allocate a non-uniform memory access (NUMA) node of a NUMA architecture to a host simulator module comprised in a NUMA architecture-based near-memory processing (NMP) emulator to perform a function of a host system;
allocate a NUMA node of the NUMA architecture to each of one or more acceleration dual in-line memory module (AXDIMM) emulator modules comprised in the NMP emulator to perform a function of a stream of an AXDIMM architecture; and
execute an application using the NMP emulator.

18. The electronic device of claim 17, wherein the host simulator module is configured to interact with the one or more AXDIMM emulator modules through an interaction module of the host simulator module.

* * * * *